US008325149B2

(12) United States Patent
Sakai et al.

(10) Patent No.: US 8,325,149 B2
(45) Date of Patent: *Dec. 4, 2012

(54) E-INK TOUCHSCREEN VISUALIZER FOR HOME AV SYSTEM

(75) Inventors: Ryutaro Sakai, Marina del Rey, CA (US); Isamu Arie, Santa Monica, CA (US); Yuki Kubota, Santa Monica, CA (US); Kuninori Hyogo, Santa Monica, CA (US); Fumiya Matsuoka, Rancho Palos Verdes, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 332 days.

This patent is subject to a terminal disclaimer.

(21) Appl. No.: 12/707,624

(22) Filed: Feb. 17, 2010

(65) Prior Publication Data

US 2010/0201646 A1    Aug. 12, 2010

Related U.S. Application Data

(63) Continuation of application No. 11/395,958, filed on Mar. 31, 2006, now Pat. No. 7,683,856.

(51) Int. Cl.
*G06F 3/041* (2006.01)

(52) U.S. Cl. .......... 345/173; 345/1.3; 345/1.1; 345/156; 345/2.1; 345/204

(58) Field of Classification Search .................. 345/1.1, 345/1.3, 2.1, 156, 173, 204
See application file for complete search history.

(56) References Cited

U.S. PATENT DOCUMENTS

| | | | | |
|---|---|---|---|---|
| 5,805,117 A | * | 9/1998 | Mazurek et al. | 345/1.3 |
| 6,118,433 A | * | 9/2000 | Jenkin et al. | 345/173 |
| 6,252,564 B1 | * | 6/2001 | Albert et al. | 345/1.3 |
| 6,376,828 B1 | * | 4/2002 | Comiskey | 250/216 |
| 6,963,937 B1 | | 11/2005 | Kamper et al. | |
| 2004/0162845 A1 | * | 8/2004 | Kim et al. | 707/102 |
| 2005/0081159 A1 | | 4/2005 | Gupta et al. | |
| 2005/0097120 A1 | | 5/2005 | Cooper et al. | |
| 2005/0132408 A1 | | 6/2005 | Dahley et al. | |

(Continued)

OTHER PUBLICATIONS

Non Final Office Action from U.S. Appl. No. 11/395,958 mailed Jul. 31, 2009.

(Continued)

*Primary Examiner* — Lun-Yi Lao
*Assistant Examiner* — Kelly B Hegarty
(74) *Attorney, Agent, or Firm* — Fitch, Even, Tabin & Flannery, LLP

(57) ABSTRACT

An interface apparatus includes a main unit, an array of interface modules, driver circuitry, and a remote unit. The main unit outputs files to an output unit, is detachably couplable to interface modules and assigns content identifiers to interface modules. The array presents an image to the user and each interface module can be engaged by a user. The driver circuitry is adapted to drive the array to present an image to the user based upon the user's engagement with an interface module. The remote unit is coupled to the output unit and can be detachably coupled to the interface module. When coupled to the interface module, the remote unit can access the assigned identifier and transmit a request signal to the main unit based on the identifier. The request signal is adapted to cause the main unit to output a file identified by the identifier to the output unit.

22 Claims, 7 Drawing Sheets

U.S. PATENT DOCUMENTS

| | | | |
|---|---|---|---|
| 2005/0161557 A1 | 7/2005 | Heintz | |
| 2005/0253777 A1* | 11/2005 | Zehner et al. | 345/1.3 |
| 2006/0007933 A1 | 1/2006 | Maxson et al. | |
| 2006/0294537 A1 | 12/2006 | Weinblatt | |
| 2009/0021496 A1* | 1/2009 | Silzars | 345/204 |
| 2010/0097294 A1* | 4/2010 | Kastrup | 345/1.3 |
| 2011/0187689 A1* | 8/2011 | Bishop | 345/208 |

OTHER PUBLICATIONS

Notice of Allowance from U.S. Appl. No. 11/395,958 mailed Nov. 9, 2009.

Sakai, et al., U.S. Appl. No. 11/395,958, filed Mar. 31, 2006.

\* cited by examiner

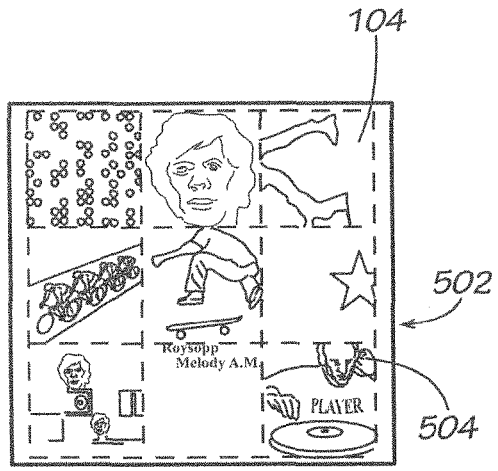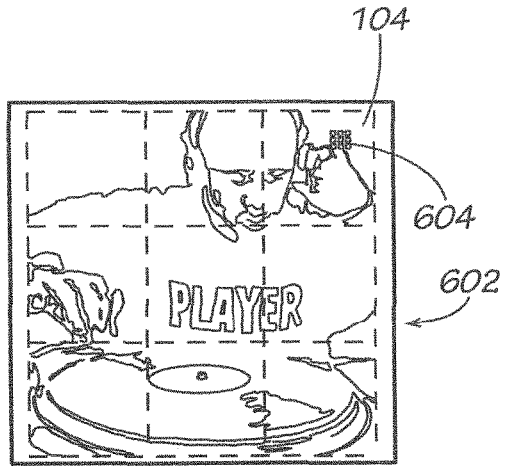
FIG. 5   FIG. 6
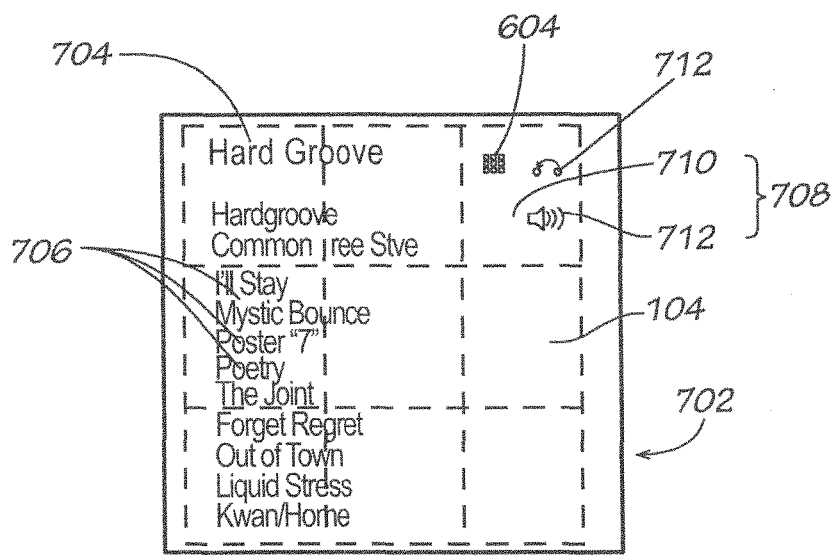
FIG. 7

E-INK TOUCHSCREEN VISUALIZER FOR HOME AV SYSTEM

CROSS-REFERENCE TO RELATED APPLICATION(S)

This document is a continuation application that is related to, and claims priority from U.S. patent application Ser. No. 11/395,958, also entitled "E-Ink Touchscreen Visualizer for Home AV System," and filed on Mar. 31, 2006, which is commonly owned, and which is hereby incorporated by this reference in its entirety.

BACKGROUND

1. Field of Invention

Embodiments described herein of the present invention relate generally to interfaces for home audio/video (AV) systems, and more specifically to an interface apparatus that facilitates a user's interaction with a home AV system and a method of using the same.

2. Discussion of the Related Art

Conventional home audio/video (AV) systems output media files (e.g., songs) to output units that include speakers. Typically, these home AV systems display the title of media files when they are output to the output units. Often, the title is displayed in a textual or thumbnail format that is either not aesthetically pleasing or is difficult to view unless the user is close to the main unit of the home AV system. Moreover, existing home AV systems do not allow users to select their favorite media files in an easy one-step action.

SUMMARY

Several embodiments of the invention advantageously address the needs above as well as other needs by providing an e-ink touchscreen visualizer for a home AV system.

One embodiment exemplarily disclosed herein relates to an interface apparatus that includes a main unit, an array of interface modules coupled to the main unit, and driver circuitry. The main unit is adapted to cause media files to be output to an output unit. The array of interface modules is adapted to present an image to the user. Moreover, each interface module in the array of interface modules is adapted to be engaged by a user and generate a signal when engaged by the user. The driver circuitry is adapted to drive the array of interface modules to present an image to the user based at least in part upon a signal generated by a user's engagement with an interface module.

Another embodiment exemplarily disclosed herein relates to an interface apparatus that includes an interface module, a main unit, driver circuitry, and a remote unit coupled to the output unit. The interface module is adapted to be driven to present an image to a user. The main unit is adapted to cause media files to be output to an output unit. Further, the main unit is adapted to be detachably coupled to the interface module and, when coupled to the interface module, to assign a content identifier to the interface module that identifies a media file. The driver circuitry is adapted to drive the interface module to present an image corresponding to the assigned content identifier. The remote unit is adapted to be detachably coupled to the interface module. When coupled to the interface module, the remote unit is adapted to access the content identifier assigned to the interface module coupled thereto and transmit a media file request signal to the main unit based on the content identifier. The media file request signal is adapted to cause the main unit to output a media file identified by the content identifier to the output unit.

Yet another embodiment exemplarily disclosed herein relates to an interface method that includes driving an array of interface modules coupled to a main unit to present an image across the array of interface modules based upon output characteristics of media files adapted to be caused to be output to an output unit via the main unit, generating a signal upon a user's engagement with an interface module, and updating the image presented across the array of interface modules based at least in part upon the signal generated upon the user's engagement with the interface module.

BRIEF DESCRIPTION OF THE DRAWINGS

The above and other aspects and features of several embodiments described herein will be more apparent from the following more particular description thereof, presented in conjunction with the following drawings.

FIG. 5 illustrates an array of interface modules driven to present an exemplary composite image comprising a plurality of constituent images.

FIG. 6 illustrates an array of interface modules driven to present an exemplary scaled image associated with a constituent image shown in FIG. 5.

FIG. 7 illustrates an array of interface modules driven to present an exemplary content-information image associated with the scaled image shown in FIG. 6.

Figure 1:
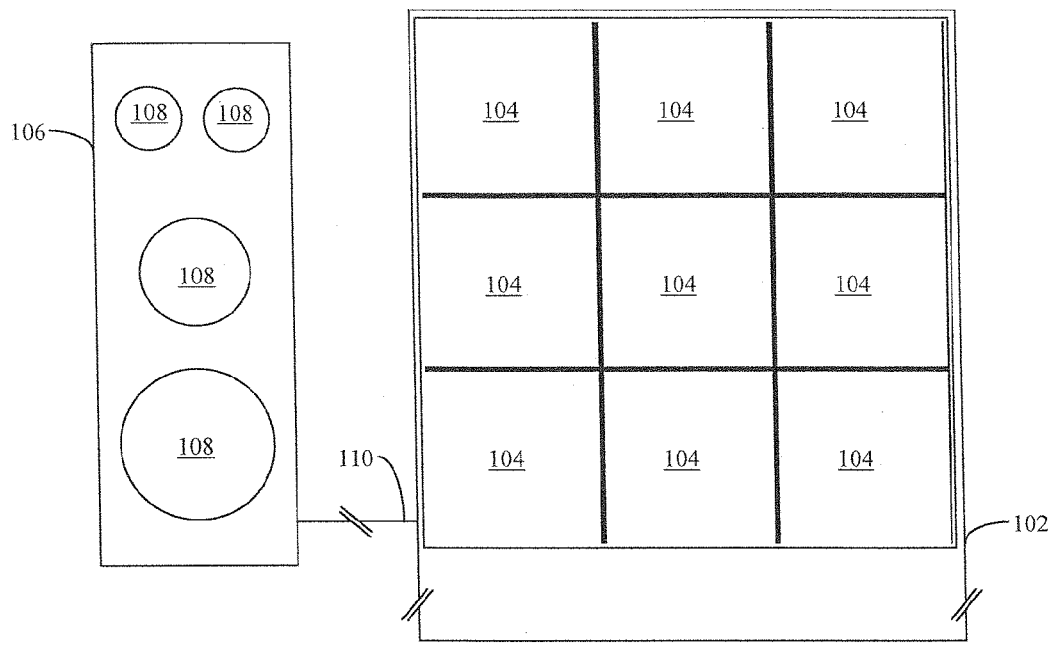
FIG. 1 illustrates one embodiment of an interface apparatus in which an exemplary home AV system incorporates a main unit.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments exemplarily described herein. Also, common but well-understood elements that are useful or necessary in a commercially feasible embodiment are often not depicted in order to facilitate a less obstructed view of these various embodiments.

DETAILED DESCRIPTION

The following description is not to be taken in a limiting sense, but is made merely for the purpose of describing the general principles of exemplary embodiments. The scope of the invention should be determined with reference to the claims.

As used herein, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and/or a computer. One or more components can reside within a process and/or thread of execution, and a component can be localized on one computer and/or distributed between two or more computers. As used herein, the term "memory" is intended to refer to a computer-readable storage medium and/or device such as read access memory (RAM), read only memory (ROM), a hard disk drive, optical disk/optical disk drive, magnetic disk/magnetic disk drive, and the like, and combinations thereof.

According to numerous embodiments disclosed herein, an interface apparatus of a home AV system visually presents information associated with media files to users in an aesthetically pleasing manner and allows users to select media files to play with ease. FIG. 1 illustrates one embodiment of such an interface apparatus of an exemplary home AV system 100.

As shown in FIG. 1, the interface apparatus includes a main unit 102 and an array of interface modules 104. As shown in FIG. 1, the exemplary home AV system 100 may include an output unit 106, a plurality of speakers 108, and a communication link 110.

Generally, the main unit 102 can be provided as any device suitable for outputting (or causing to be output) media files (e.g., music, pictures, movies, electronic documents, or any other audio and/or video data) to one or more output units such as output unit 106. According to numerous embodiments disclosed herein, the main unit 102 is further adapted to drive the array of interface modules 104 in a manner that causes an image (e.g., a composite image, a scaled image, a content-information image, as will be described in greater detail below with respect to FIGS. 4-7) to be presented by the array of interface modules 104.

In the illustrated embodiment, the array of interface modules 104 is essentially a square/rectangular array and can be attached to and detached from (i.e., detachably coupled to) the main unit 102 via any suitable means (e.g., magnetically or mechanically via a tongue-in-groove arrangement between cooperative surfaces of the main unit 102 and the interface modules 104, latch, clip, or the like, or combinations thereof). It will be appreciated, however, that the plurality of interface modules 104 may be arranged in any desired pattern. As illustrated, the array of interface modules is comprised of nine individual interface modules 104. It will be appreciated however, that the array of interface modules may comprise more or less numbers of individual interface modules 104. Moreover, it will be appreciated that the interface apparatus may include more interface modules 104 than can be coupled to the main unit 102 at one time.

Figure 2:
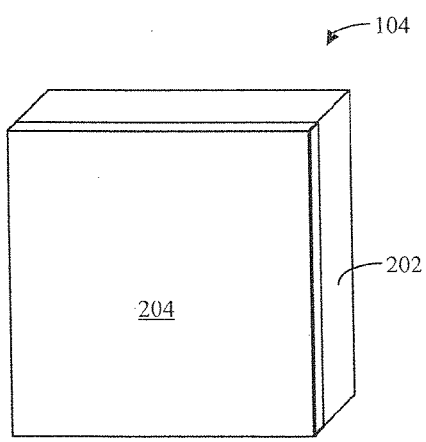
FIG. 2 illustrates one embodiment of interface module incorporated within the interface apparatus shown in FIG. 1.

FIG. 2 illustrates one embodiment of an interface module 104 incorporated within the interface apparatus shown in FIG. 1. As shown in FIG. 2, each interface module 104 includes a module housing 202 and a touch-sensitive display 204 mounted to the module housing 202. The module housing 202 further contains other components described in greater detail with respect to FIG. 3. The touch-sensitive display 204 is adapted to present images in an electronically controllable manner. As will be described in greater detail below, the touch-sensitive display 204 is also adapted to generate engagement signals upon being engaged (e.g., touched) by the user (e.g., via the user's finger, via a stylus held by the user, etc.). Suitable touch-sensitive displays that may be incorporated within the interface module 104 include, for example, e-ink displays (also known as electronic paper, electronic ink, and e-paper) fitted with touch-screen elements (e.g., resistive, electromagnetic, etc.), all of which are well known in the art. It will also be appreciated that, instead of an e-ink display, other types of electronically controllable displays (e.g., LCD, OLED, etc.) may also be used.

Referring back to FIG. 1, the output unit 106 includes the plurality of speakers 108 and is communicatively coupled to the main unit 102 via the communication link 110 (e.g., one or more wired or wireless communication paths). While the embodiment illustrated in FIG. 1 exemplarily depicts only one output unit 106 as a speaker unit containing the plurality of speakers 108 capable of presenting sound (e.g., as music, voice, etc.), it will be appreciated that the output unit 106 can be provided as any type of device (e.g., computer, monitor, television, projector, personal digital assistant, cellular phone, etc.) capable of presenting any type of media file to a user and that any number of output units may be communicatively coupled to the main unit 102 via one or more communication links 110.

Figure 3:
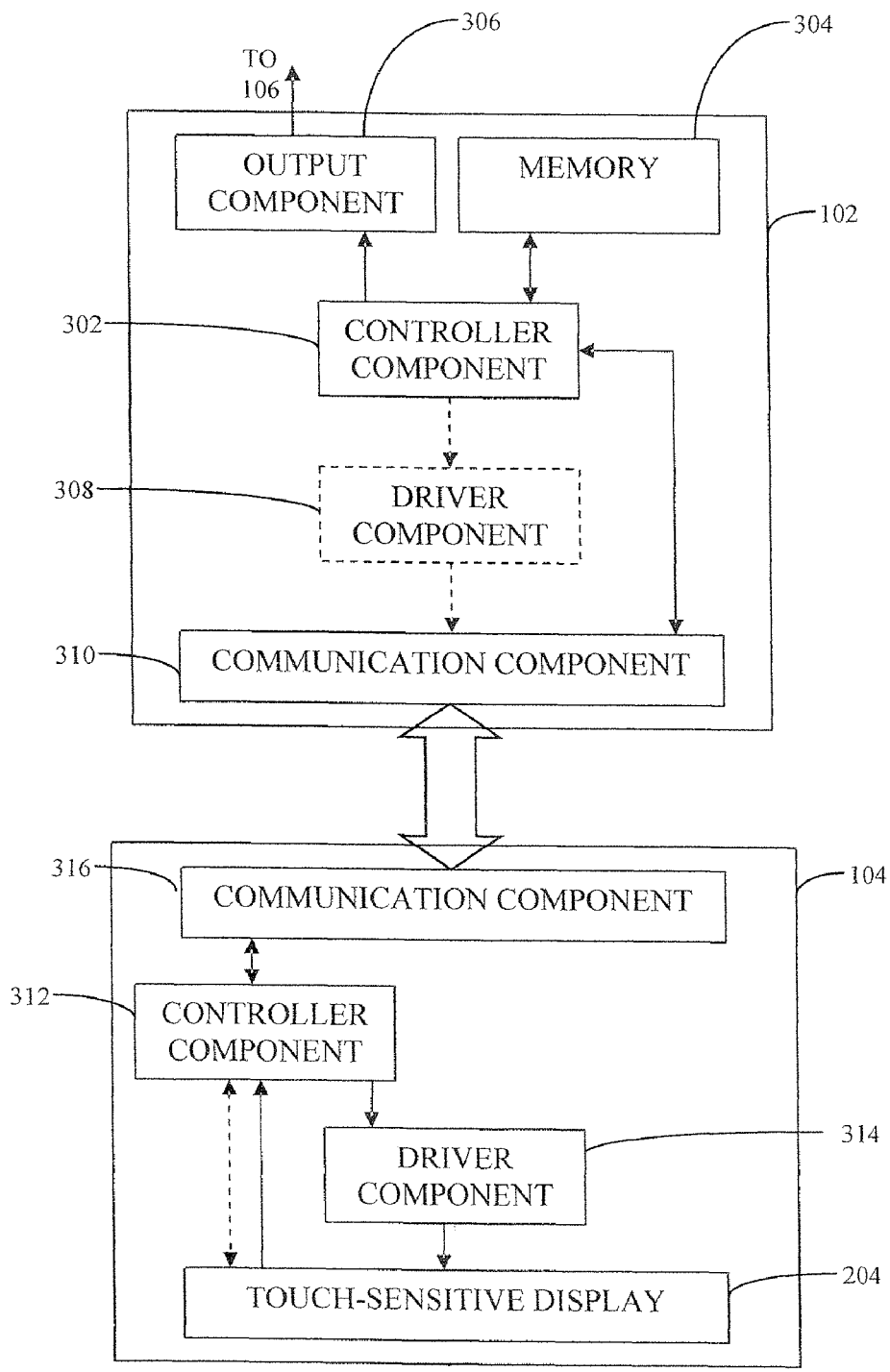
FIG. 3 illustrates an exemplary functional block diagram of components within the interface apparatus shown in FIG. 1.

FIG. 3 illustrates an exemplary functional block diagram of components within the interface apparatus shown in FIG. 1. Generally, FIG. 3 illustrates functional components of the main unit 102 and an interface module 104. As shown, the main unit 102 includes a main controller component 302, a main memory 304, a main output component 306, an optional main driver component 308, and a main communication component 310. An exemplary interface module 104 is shown to include a module controller component 312, an optional module driver component 314, the touch-sensitive display 204, and a module communication component 316.

As illustrated, the main controller component 302 is connected to the main memory 304, the main output component 306, and the main communication component 310 while the module controller component 312 is connected to the module communication component 316 and the touch-sensitive display 204. In one embodiment, the main unit 102 includes the main driver component 308. In such an embodiment, the main driver component 308 is connected between an output of the main controller component 302 and an input of the main communication component 310 and the module driver component 314 is not included within the interface module 104. In another embodiment, the interface module 104 includes the module driver component 314. In such an embodiment, the module driver component 314 is connected between an output of the module controller component 312 and an input of the touch-sensitive display 204 and the main driver component 308 is not included within the main unit 102.

The main memory 304 is adapted to store media files in a manner that is accessible by the main controller component 302. Each media file stored within the main memory 304 is uniquely identified within the main memory 304 by a content identifier. Generally, media files can be any digital audio or video files, in any format. Aside from the actual audio and/or video content to be presented via the output unit 106, media files also include descriptors of attributes associated with the audio/video content. For example, if a media file is an album comprising a collection of tracks, the attributes associated with the album can include album title, song titles, etc., and descriptors of the attributes include the actual title of the album, song, etc. In one embodiment, each media file may further include interface-image information describing how that media file is to be visually identified to the user via one or more interface modules 104 within the array of interface modules. For example, if a media file is an album comprising a collection of songs, the interface-image information can describe an image such as cover art associated with the album.

The main controller component 302 is adapted to access media files stored within the main memory 304 and output the accessed media files to the output unit 106 based upon information contained within selection signals transmitted by one or more interface modules 104 within the array of interface modules. In one embodiment, the main controller component 302 outputs media files to the output unit 106 by generating a data stream containing one or more output signals. In one embodiment, an output signal generated by the main controller component 302 may include an output unit address adapted to ensure that media files are output only to selected output units associated with the output unit address included within the data stream.

The main controller component 302 is adapted to generate image information based on information contained within selection signals transmitted by interface modules 104 within the array of interface modules. As used herein, the term "image information" refers to information required by either the main or module driver components 308 or 316, respectively, to drive each of the interface modules 104 within the array of interface modules to present the aforementioned composite, scaled, and content-information images. In one embodiment, the main controller component 302 is adapted to generate image information upon determining which interface module 104 within the array of interface modules has been engaged (e.g., touched) by a user and/or upon determining where a user has engaged (e.g., touched) an interface module within the array of interface modules. Generally, the main controller component 302 is adapted to make such determinations based on information contained within selection signals transmitted by engaged interface modules 104.

In one embodiment, and as will be discussed in greater detail with respect to FIGS. 4-7, the image information may also be generated based on interface-image information associated with one or more media files. In a further embodiment, the image information may also be generated based on output characteristics of media files that the main unit 102 can cause to be output at the output unit 106. An output characteristic of a media file that has been output by the main unit 102 may, for example, include the time/date in which the media file was output to the output unit 106, the frequency with which the media file was output to the output unit 106 (e.g., within a period of a week, month, year, etc.), or the like. The main output component 306 is adapted to process the data stream (e.g., amplify output signals contained within the data stream, etc.) before media files are output to the output unit 106.

When the main driver component 308 is included within the main unit 102, the main controller component 302 outputs the image information to the main driver component 308 and the main driver component 308 converts the image information into image data. The image data is then output by the main driver component 308 to the main communication component 310 where it is transmitted to the interface modules 104 within the array of interface modules and ultimately used to drive each interface module 104 in the array interface modules to present the aforementioned composite, scaled, and content-information images. When the main driver component 308 is not included within the main unit 102, the main controller component 302 outputs the image information to the main communication component 310.

The main and module communication components 310 and 316, respectively, are adapted to facilitate communication between the main unit 102 and the interface module 104. Accordingly, the main communication component 310 is adapted to transmit image information and/or image data to each interface module 104 within the array of interface modules and is further adapted to receive selection information from each interface module 104 within the array of interface modules. Conversely, the module communication component 316 of each interface module 104 within the array of interface modules is adapted to transmit selection information to the main unit 102 and is further adapted to receive image information and/or image data from the main unit 102. In one embodiment, the main and module communication components 310 and 316, respectively, are adapted to transmit/receive information/data wirelessly between the main unit 102 and the associated interface module 104 within the array of interface modules and, therefore, may include any suitable type of wireless receiver, transmitter, or transceiver. For example, the main and module communication components 310 and 316, respectively, may each include an antenna coupled to a radio frequency (RF) receiver, transmitter, or transceiver. In one embodiment, the main and module communication components 310 and 316, respectively, may each be comprised within radio frequency identification (RFID) circuitry associated with the main unit 102 and the interface module 104, respectively, such that electronics within the interface module 104 (e.g., the module controller, driver, and communication components 312, 314, and 316, respectively, and the touch-sensitive display 204) receive sufficient electrical power to function as described in the paragraphs below. Accordingly, and in one embodiment, each interface module 104 may not include an internal power supply but, rather, operate based on electricity generated by the interaction between the RFID circuitry associated with the main unit 102 and the interface module 104. In another embodiment, the main and module communication components 310 and 316, respectively, may be adapted to communicate with each other via a non-RFID means such as Bluetooth, Wi-Fi, etc. When, for example, either Bluetooth, Wi-Fi, or the like, are used, each interface module 104 includes an internal battery which can be charged while the interface module 104 is coupled to the main unit 102. When the internal battery is charged, the electronics within the interface module 104 receive sufficient electrical power to function as described in the paragraphs below.

The module controller component 312 is adapted to receive image information/image data that has been transmitted to the module communication component 316. When the module driver component 314 is not included within the interface module 104, the module controller component 312 outputs image data directly to the touch-sensitive display 204. However, when the module driver component 314 is included within the interface module 104, the module controller component 312 outputs image information to the module driver component 314. The module driver component 314 then converts the image information into image data and outputs the image data to the touch-sensitive display 204.

When image data is output to the touch-sensitive display 204 of each interface module 104 in the array interface modules (either from the module controller component 312 or the module driver component 314), each interface module 104 within the array of interface modules is driven to present the aforementioned composite, scaled, and content-information images across the array of interface modules. Because the interface modules 104 within the array of interface modules can be driven by various combinations of the main and module controller components 302 and 312, respectively, and the main and module driver components 308 and 314, respectively, these components can collectively be referred to as driver circuitry.

As mentioned above, the touch-sensitive display 204 is adapted to generate engagement signals upon being engaged (e.g., touched) by the user (e.g., via the user's finger or a stylus held by the user). In one embodiment, the engagement signals contain engagement-location information that represents a physical location where the user engaged the touch-sensitive display 204. Accordingly, engagement signals generated by the touch-sensitive display 204 represent a physical location of the user's engagement with the interface module 104. The touch-sensitive display 204 is further adapted to output the engagement signals generated therein to the module controller component 312.

The module controller component 312 is further adapted to receive engagement signals output by the touch-sensitive display 204, generate one or more selection signals based on the received engagement signals, and output the selection signals to the module communication component 316. In one embodiment, selection signals generated by the module controller component 312 of an engaged interface module 104 contain module identifier information that uniquely identifies the engaged interface module 104 from other interface modules 104 within the array of interface modules. In another embodiment, selection signals generated by the module controller component 312 of the engaged interface module 104 contain module identifier information in addition to the aforementioned engagement-location information. The engagement-location information included within the selection signals can be absolute (i.e., identifying the physical location of the user's engagement with the engaged interface module 104 with respect to the engaged interface module) or relative (i.e., identifying the physical location of the user's engagement with the engaged interface module 104 with respect to the array of interface modules). Having exemplarily described the interface apparatus above, an exemplary method of driving the array of interface modules will now be described in greater detail below.

Figure 4:
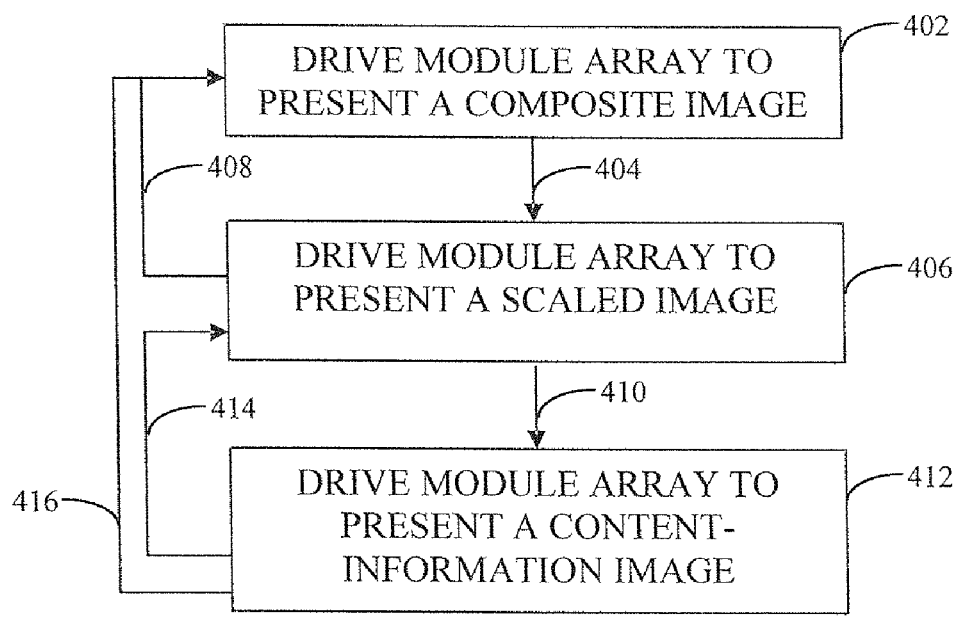
FIG. 4 illustrates a flow chart describing one embodiment of a method for driving the array of interface modules shown in FIG. 1 to present images across the array of interface modules.

FIG. 4 illustrates a flow chart describing one embodiment of a method for driving the array of interface modules shown in FIG. 1 to present images across the array of interface modules.

At 402, the main controller component 302 generates image information that, when converted into image data, is adapted to drive each interface module 104 within the array of interface modules to present a composite image across the array of interface modules. As used herein, a composite image is comprised of a plurality of constituent images and each constituent image visually identifies a media file stored within the main memory 304. As mentioned above, image information is generated at 402 based upon interface-image information associated with one or more media files. Accordingly, each constituent image is presented within the array of interface modules in accordance with interface-image information associated with corresponding interface-image information. As also mentioned above, image information is generated at 402 based upon output characteristics of one or more media files that the main unit 102 can cause to be output at the output unit 106. Accordingly, the array of interface modules can be driven to present a composite image comprised of a plurality of constituent images that visually identify only media files that have been recently output to the output unit 106, that have been frequently output to the output unit 106, etc.

FIG. 5 illustrates an exemplary composite image 502 comprised of a plurality of constituent images 504. As shown, each constituent image 504 visually identifies a media file (e.g., a music album) via an image (e.g., cover art) presented in accordance with interface-image information associated with that media file. Moreover, the composite image comprises only constituent images associated with media files that have been recently output to the output unit 106, that have been frequently output to the output unit 106, or the like. In another embodiment, however, only one constituent image (e.g., the center constituent image) within the composite image is associated with a media file that has been recently output to the output unit 106, that has been frequently output to the output unit 106, or the like. In this case, constituent images surrounding the center constituent image are associated with related media files (i.e., media files related to the media file that has been recently output (or frequently output, etc.) to the output unit 106 by artist, song, genre, etc.). Accordingly, a plurality of interface modules 104 may be driven to present the surrounding constituent images based on meta data associated with the media file visually identified by the center interface module 104, based on recommendations provided by an interne service that pushes such information to the main unit 102 over a network, etc.

In the embodiment illustrated in FIG. 5, each interface module 104 is driven to present a single constituent image 504. In one embodiment, each interface module 104 may be driven to present a sequence of constituent images 504, wherein the constituent image presented by an interface module 104 changes within a certain interval. As described above, the driver circuitry is adapted to drive each interface module 104 within the array of interface modules to present a composite image across the array of interface modules, wherein the composite image comprises a plurality of the aforementioned constituent images.

Referring back to FIG. 4, at 404, an engagement signal is generated by a touch-sensitive display 204 of an interface module 104 that has been engaged (e.g., touched) by a user. The engagement signal is then output to the module controller component 312 incorporated within the engaged interface module 104. The module controller component 312 subsequently generates a selection signal that includes module identifier information and/or engagement-location information. The selection signal is output from the module controller component 312 to the module communication component 316, where it is subsequently transmitted to the main controller component 302 via the main communication component 310.

At 406, the main controller component 302 receives the selection signal transmitted by the engaged interface module 104 at 404 and generates image information based on information contained within the received selection signal. The image information generated at 406, when converted into image data, is adapted to drive each interface module 104 within the array of interface modules to present a scaled image associated with a constituent image 504 presented by the engaged interface module 104 across the array of interface modules.

FIG. 6 illustrates an array of interface modules driven to present an exemplary scaled image associated with a constituent image shown in FIG. 5. As shown in FIG. 6, the scaled image 602 is an enlarged version of the constituent image 504 presented by the lower-right interface module 104 in FIG. 5. Thus, FIG. 6 illustrates the result of a process wherein the interface module 104 presenting the lower-right constituent image 504 (shown in FIG. 5) has been engaged (e.g., touched) by a user, the touch-sensitive display 204 of the engaged interface module 104 has generated an engagement signal, the module controller component 312 of the engaged interface module 104 has generated a selection signal containing module identifier information and/or engagement-location information, the selection signal has been transmitted to the main controller component 302 via the module and main communication components 316 and 310, respectively, and the main controller component 302 has generated image information at 406 based upon the received selection signal. As described above, the driver circuitry is therefore adapted to drive each interface module 104 within the array of interface modules to present a scaled image of the constituent image, presented by an engaged interface module 104, across the array of interface modules based upon an engagement signal generated by the engaged interface module 104 (i.e., the interface module driven to present the constituent image). That is, the driver circuitry is adapted to update the image presented across the array of interface modules based at least in part upon an engagement signal generated upon the user's engagement with an interface module 104.

In one embodiment, and with reference to FIG. 6, the image information generated at 406 includes icon-location information which, when converted into image data, is adapted to drive an interface module 104 (e.g., the top-right interface module 104 within the array of interface modules) to present a revert-to-composite icon 604 at a predetermined location on one or more interface modules 104 within the array of interface modules. While FIG. 6 illustrates only one icon presented by only the top-right interface module 104, it will be appreciated that one or more interface modules 104 within the array of interface modules may be driven to present one or more icons simultaneous with the presentation of the scaled image 602, as necessitated by the functionality provided by the interface apparatus. In one embodiment, the revert-to-composite icon 604 provides a visual indication of a location where a user can engage an interface module 104 to cause the composite image 502, previously presented at 402, to be presented across the array of interface modules, instead of the scaled image 602.

Referring back to FIG. 4, at 408, an engagement signal is generated by a touch-sensitive display 204 of an interface module 104 driven to present the revert-to-composite icon 604 upon being engaged (e.g., touched) by a user at a location corresponding to where the revert-to-composite icon 604 is presented. When engagement-location information transmitted by the engaged interface module 104 matches the icon-location information generated at 406, the main controller component 302 generates image information as described above at 402 which, when converted to image data, is adapted to drive each interface module 104 within the array of interface modules to present a composite image across the array of interface modules. Accordingly, the driver circuitry is adapted to update the image presented across the array of interface modules based at least in part upon an engagement signal generated upon the user's engagement with an interface module 104.

At 410, an engagement signal is generated by a touch-sensitive display 204 of an interface module 104 that has been engaged (e.g., touched) by a user at a location corresponding to where the revert-to-composite icon 604 is not presented and selection signal is generated by the module controller component 312 associated with the engaged interface module 104. The selection signal is then transmitted by the engaged interface module 104 to the main controller component 302 via the module and main communication components 316 and 310, respectively. In one embodiment, the selection signal generated at 410 includes the module-identifier information. In another embodiment, the selection signal generated at 410 includes engagement-location information. In another embodiment, the selection signal generated at 410 includes module-identifier information and engagement-location information.

At 412, the main controller component 302 receives the selection signal transmitted by the engaged interface module 104 and generates image information based on the received selection signal. The image information generated at 412, when converted into image data, is adapted to drive each interface module 104 within the array of interface modules to present a content-information image across the array of interface modules. In one embodiment, the content-information image visually identifies one or more of the aforementioned descriptors of attributes associated with the scaled image presented by the array of interface modules at 406.

FIG. 7 illustrates an exemplary content-information image 702. As shown in FIG. 7, the content-information image 702 visually identifies a descriptor of an album title attribute at 704 (e.g., "Hard Groove") and descriptors of song title attributes at 706 (e.g., "Hardgroove", "Common Free Style", "I'll Stay", "Mystic Bounce", "Poster 'T'", "Poetry", etc.). As also shown, the content-information image also visually identifies a now-playing-indicator 708 identifying a particular track that is currently being presented to the user via the output unit 106. In the illustrated embodiment, the now-playing-indicator includes a highlighted bar 710 surrounding a descriptor of a song title attribute 706 and a graphical depiction of a speaker 712 emitting sound disposed within the highlighted bar 710.

Thus, FIG. 7 illustrates the result of a process wherein an interface module 104 presenting the scaled image 602 (shown in FIG. 6) has been engaged (e.g., touched) by a user at a location not corresponding to the revert-to-composite icon 604, the touch-sensitive display 204 of the engaged interface module 104 has generated an engagement signal, the module controller component 312 of the engaged interface module 104 has generated a selection signal containing module identifier information and/or engagement-location information, the selection signal has been transmitted to the main controller component 302 via the module and main communication components 316 and 310, respectively, and the main controller component 302 has generated image information at 412 based upon the received selection signal. As described above, the driver circuitry is therefore adapted to drive each interface module 104 within the array of interface modules to present a content-information image, associated with the scaled image, across the array of interface modules based upon an engagement signal generated by an engaged interface module 104. That is, the driver circuitry is adapted to update the image presented across the array of interface modules based at least in part upon an engagement signal generated upon the user's engagement with an interface module 104.

In one embodiment, a user may select a particular track to be presented via the output unit 106 by engaging (e.g., touching) an interface module 104 within the array of interface modules at a location corresponding to the descriptor of the song title attribute 706 associated with the particular track (e.g., Hardgroove). Upon a user's engagement with the touch-sensitive display 204, an engagement signal is generated and output to the module controller component 312 of the engaged interface module 104. A selection signal containing module identifier information and/or engagement-location information is then generated by the module controller component 312 and transmitted to the main controller component 302. The main controller component 302 generates image information based upon the selection signal transmitted by the engaged interface module 104 which, when converted into image data, is adapted to drive one or more interface modules 104 within the array of interface modules to present the now-playing-indicator surrounding the descriptor of song title attribute 706 associated with the particular track.

In another embodiment, the image information generated at 412 further includes icon-location information which, when converted into image data, is adapted to drive an interface module 104 (e.g., the top-right interface module 104 within the array of interface modules) to present the aforementioned revert-to-composite icon 604 in addition to a revert-to-scale icon 712 at predetermined locations on one or more interface modules 104 within the array of interface modules. While FIG. 7 illustrates only one icon presented by only the top-right interface module 104, it will be appreciated that one or more interface modules 104 within the array of interface modules may be driven to present one or more icons simultaneously with the presentation of the content-information image 702, as necessitated by the functionality provided by the interface apparatus. In one embodiment, the revert-to-scale icon 712 provides a visual indication of a location where a user can engage an interface module 104 to cause the scaled image 602, previously presented at 406, to be presented across the array of interface modules, instead of the content-information image 702.

Referring back to FIG. 4, at 414, an engagement signal is generated by a touch-sensitive display 204 of an interface module 104 driven to present the revert-to-composite icon 604 upon being engaged (e.g., touched) by a user at a location corresponding to where the revert-to-composite icon 604 is presented. As similarly described above at 408, when engagement-location information transmitted by the engaged interface module 104 matches icon-location information generated at 412 that corresponds to the revert-to-composite icon 604, the main controller component 302 generates image information as described above at 402 which, when converted to image data, is adapted to drive each interface module 104 within the array of interface modules to present a composite image across the array of interface modules. Accordingly, the driver circuitry is adapted to update the image presented across the array of interface modules based at least in part upon an engagement signal generated upon the user's engagement with an interface module 104.

At 416, an engagement signal is generated by a touch-sensitive display 204 of an interface module 104 driven to present the revert-to-scale icon 712 upon being engaged (e.g., touched) by a user at a location corresponding to where the revert-to-scale icon 712 is presented. When engagement-location information transmitted by the engaged interface module 104 matches icon-location information generated at 412 that corresponds to the revert-to-scale icon 712, the main controller component 302 generates image information as described above at 406 which, when converted to image data, is adapted to drive each interface module 104 within the array of interface modules to present a scaled image across the array of interface modules. Accordingly, the driver circuitry is adapted to update the image presented across the array of interface modules based at least in part upon an engagement signal generated upon the user's engagement with an interface module 104.

As mentioned above, the main controller component 302 is adapted to access and output one or more media files to the output unit 106 based upon information contained within selection signals transmitted by interface modules 104 within the array of interface modules. In one embodiment, the main controller component 302 may output a media file (or portion thereof) based upon information contained within a selection signal generated at 404 (i.e., after a user has engaged an interface module 104 within the array of interface modules, driven to present a composite image, thereby confirming the user's desire to output a media file visually identified by a constituent image presented by the engaged interface module 104). In another embodiment, the main controller component 302 may output a media file (or portion thereof) based upon information contained within a selection signal generated at 410 (i.e., after a user has engaged an interface module 104 within the array of interface modules, driven to present a scaled image, thereby confirming the user's desire to output a media file visually identified by the scaled image presented across the array of interface modules 104). In yet another embodiment, the main controller component 302 may output a media file (or portion thereof) based upon information contained within a selection signal generated when the array of interface modules has been driven to present a content-information image.

By driving the array of interface modules as described above in response to a user's engagement with interface modules 104 within an array of interface modules, a user may easily select media files to be output to the output unit 106. Moreover, by providing an array of interface modules, each with a touch-sensitive display 204, information associated with media files can be visually presented to the user in an aesthetically pleasing manner across a large image-presenting surface. Finally, because each touch-sensitive display 204 includes an e-ink display, images presented to a user of the home AV system can have a unique, furniture-like quality.

As described above with respect to FIGS. 1-7 individual interface modules 104 within the array of interface modules can be engaged (e.g., touched) by a user and aid the user in navigating through media files via the aforementioned composite, scaled, and content-information images. In one embodiment, however, an interface module 104 that is detached from the main unit 102, but still communicatively coupled to the main unit 102 (e.g., via the main and module communication components 310 and 316, respectively) can be engaged (e.g., touched) by the user and driven to present the aforementioned composite, scaled, and content-information images on the touch-sensitive display 204 and/or across the array of interface modules. Accordingly, a detached interface module 104 may be used by a user as a "remote control" of the main unit 102.

Figure 8:
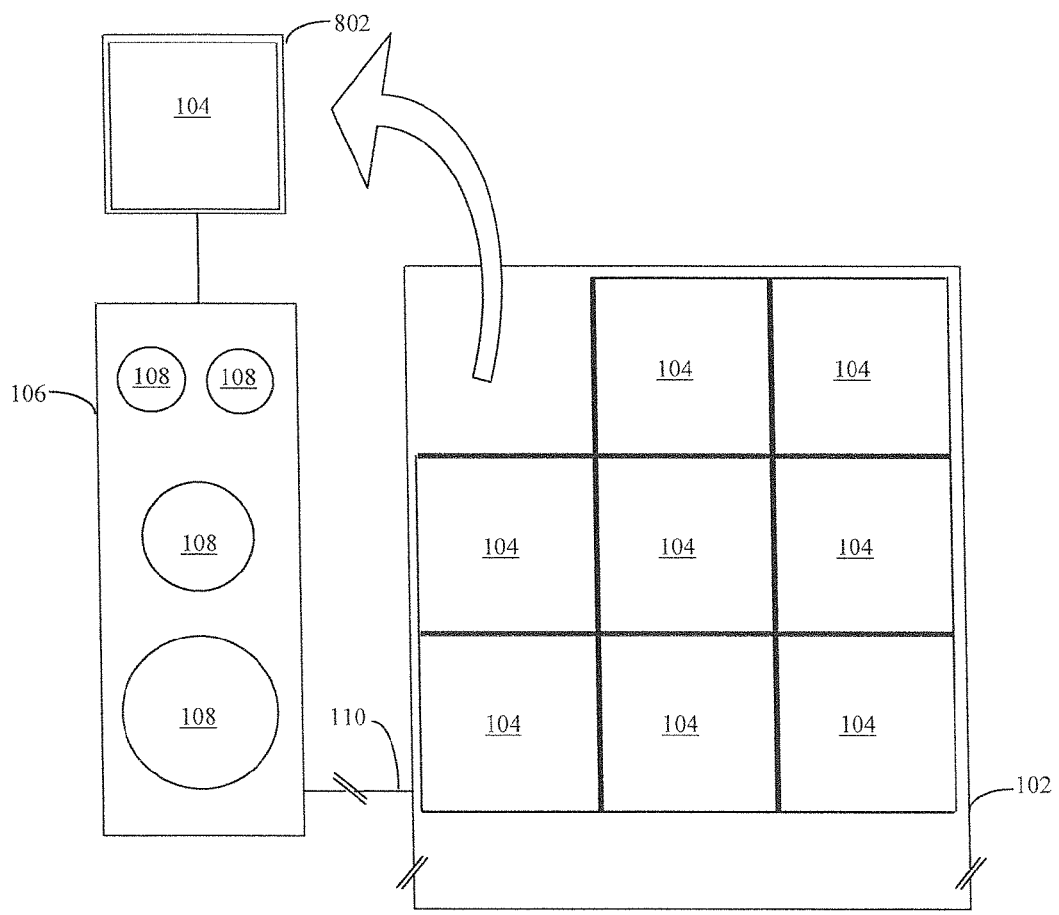
FIG. 8 illustrates another embodiment of an interface apparatus in which an exemplary output unit of a home AV system incorporates a remote unit.

According to numerous embodiments disclosed herein, the interface apparatus described above with respect to FIGS. 1-3 also enables users of the home AV system to control which output unit(s) media files are to be output to in a simple, intuitive manner. FIG. 8 illustrates an embodiment of such an interface apparatus of the aforementioned exemplary home AV system 100.

As shown in FIG. 8, the interface apparatus exemplarily described above with respect to FIG. 1 further includes a remote unit 802 coupled to the output unit 106. Also shown in FIG. 8 are the main unit 102, the interface modules 104, the output unit 106 containing the plurality of speakers 108, and the communication link 110. FIG. 8 also illustrates wherein one interface module 104 has been detached from the main unit 102 and attached to the remote unit 802.

As illustrated in FIG. 8, the main unit 102 may be further adapted to assign one or more content-identifiers to one or more of the aforementioned interface modules 104 within the array of interface modules. Moreover, each interface module 104 may be further adapted to store one or more content identifiers assigned by the main unit 102. As mentioned above, each interface module 104 can be detachably coupled to the main unit 102. Similarly, each interface module 104 can also be detachably coupled to the remote unit 802 via any suitable means (e.g., magnetically or mechanically via a tongue-in-groove arrangement between cooperative surfaces of the main unit 102 and the interface modules 104, latch, clip, or the like, or combinations thereof).

Figure 9:
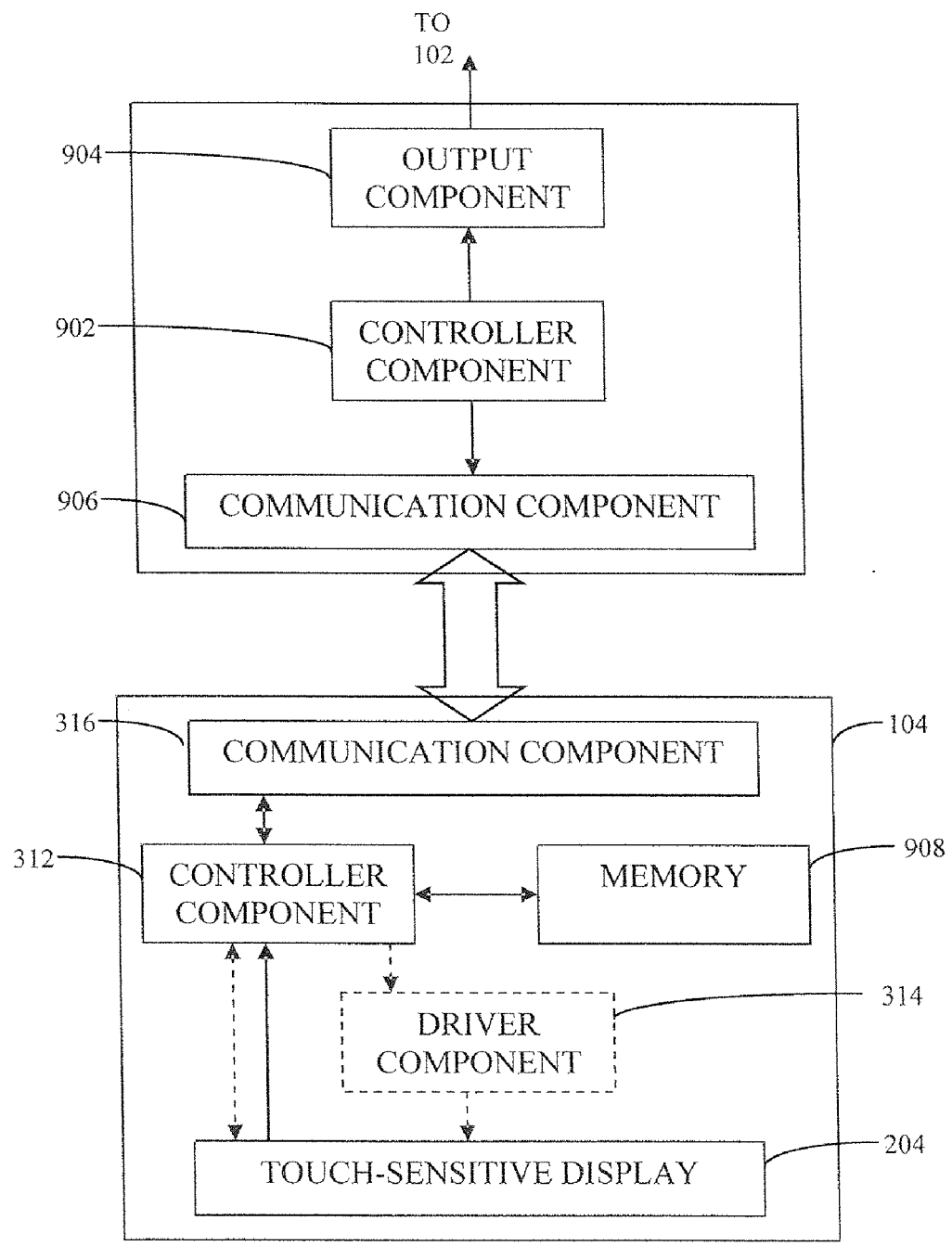
FIG. 9 illustrates an exemplary functional block diagram of components within the interface apparatus shown in FIG. 8.

FIG. 9 illustrates an exemplary functional block diagram of components within the interface apparatus shown in FIG. 8. Generally, FIG. 9 illustrates the remote unit 802 and an interface module 104. As shown, the remote unit 802 includes a remote controller component 902, a remote output component 904, and a remote communication component 906. As described above with respect to FIG. 3, the interface module 104 includes the module controller component 312, the optional module driver component 314, the touch-sensitive display 204, and the module communication component 316 in addition to a module memory 908.

As illustrated, the remote controller component 902 is connected to the remote output component 904 and the remote communication component 906 while the module controller component 312 is connected to the module communication component 316, the touch-sensitive display 204, and the module memory 908.

The remote controller component 902 is adapted to access content identifiers stored within the module memory 908 and generate one or more media file request signals based on the content identifiers accessed from the module memory 908. In one embodiment, the media file request signal is adapted to cause the main unit 102 to output specific media files (i.e., media files corresponding to the accessed content identifiers) to the output unit to which the associated remote unit 802 is coupled. Accordingly, a media file request signal may, for example, include the aforementioned output unit address, identifying the output unit 106 to which the associated remote unit 802 is coupled, and one or more of the accessed content identifiers.

The remote output component 904 is adapted to receive media file request signals generated by the remote controller component 902 and transmit the generated media file request signals to the main unit 102. In one embodiment, media file request signals may be transmitted to the main unit 102 via the communication link 110.

The module and remote communication components 316 and 906, respectively, are adapted to communicate content identifier information representing assigned content identifiers from the interface module 104 to the remote unit 802. Accordingly, the remote communication component 906 is adapted to receive content identifier information transmitted by the module communication component 316. In one embodiment, the module and remote communication components 316 and 906, respectively, are adapted to transmit/receive signals wirelessly between the remote unit 802 and the interface module 104 and may, therefore, include any suitable type of wireless receiver, transmitter, or transceiver. For example, the module and remote communication components 316 and 906, respectively, may each include an antenna coupled to a radio frequency (RF) receiver, transmitter, or transceiver. In one embodiment, the module and remote communication components 316 and 906, respectively, may each be comprised within radio frequency identification (RFID) circuitry associated with the interface module 104 and remote unit 802, respectively, such that elements within the interface module 104 (e.g., the module controller, driver, and communication components 312, 314, and 316, respectively, the touch-sensitive display 204, and the module memory 908) receive sufficient electrical power to function as described herein. Accordingly, and in one embodiment, the interface module 104 may not include an internal power supply but, rather, operate based on electricity generated by the interaction between the RFID circuitry associated with the remote unit 802 and the interface module 104. In another embodiment, the module remote communication components 316 and 906, respectively, may be adapted to communicate with each other via a non-RFID means such as Bluetooth, Wi-Fi, etc. When, for example, either Bluetooth, Wi-Fi, or the like, are used, each interface module 104 includes an internal battery which can be charged while the interface module 104 is coupled to the main unit 102. When the internal battery is charged, the electronics within the interface module 104 receive sufficient electrical power to function as described herein.

As mentioned above, the module memory 908 is adapted to store one or more content identifiers assigned to the associated interface module 104 by the main unit 102. In one embodiment, one or more content identifiers may be assigned to interface modules 104 that are coupled to the main unit 102. To assign a content identifier to an interface module 104, the main controller component 302 may, for example, output one or more content identifiers to the main communication component 310 and the main communication component 310 may then transmit the one or more content identifiers to the module communication component 316 of a particular interface module 104. The received content identifier(s) are then output to the module controller component 312 where they are subsequently stored in the module memory 908.

In one embodiment, a content identifier assigned to a particular interface module 104 within the array of interface modules corresponds to a content identifier identifying a media file visually identified by a constituent image 504, presented by the particular interface module 104, and comprised within a composite image 502 presented across the array of interface modules. In another embodiment, a content identifier assigned to any interface module 104 within the array of interface modules corresponds to a content identifier identifying a media file visually identified by a scaled image 602 presented across the array of interface modules. Accordingly, when the main unit 102 assigns a content identifier to a particular interface module 104, the aforementioned driver circuitry may drive the particular interface module 104 to present an image corresponding to the scaled image 602 upon being removed from the array of interface modules. In a further embodiment, an interface module 104 having an assigned content identifier stored therein, presenting an image associated with the assigned content identifier, and detached from the main unit 102, may be used to control the outputting of a media file to the output unit 106. For example, upon coupling the detached interface module 104 to the main unit, the assigned content identifier can be transmitted to the main controller component 302 and the main controller component can cause a media file associated with the assigned content identifier to be subsequently output to the output unit 106. In another example, upon coupling the detached interface module 104 to the main unit, the assigned content identifier can be transmitted to the main controller component 302 and the driver circuitry can cause a scaled image to be presented across the array of interface modules, wherein the scaled image corresponds to the image presented by the previously-detached interface module 104.

In the embodiment illustrated in FIG. 9, the module controller component 312 is further adapted to access content identifiers stored within the module memory 908 and generate the aforementioned content identifier information based upon the accessed content identifiers.

Figure 10:
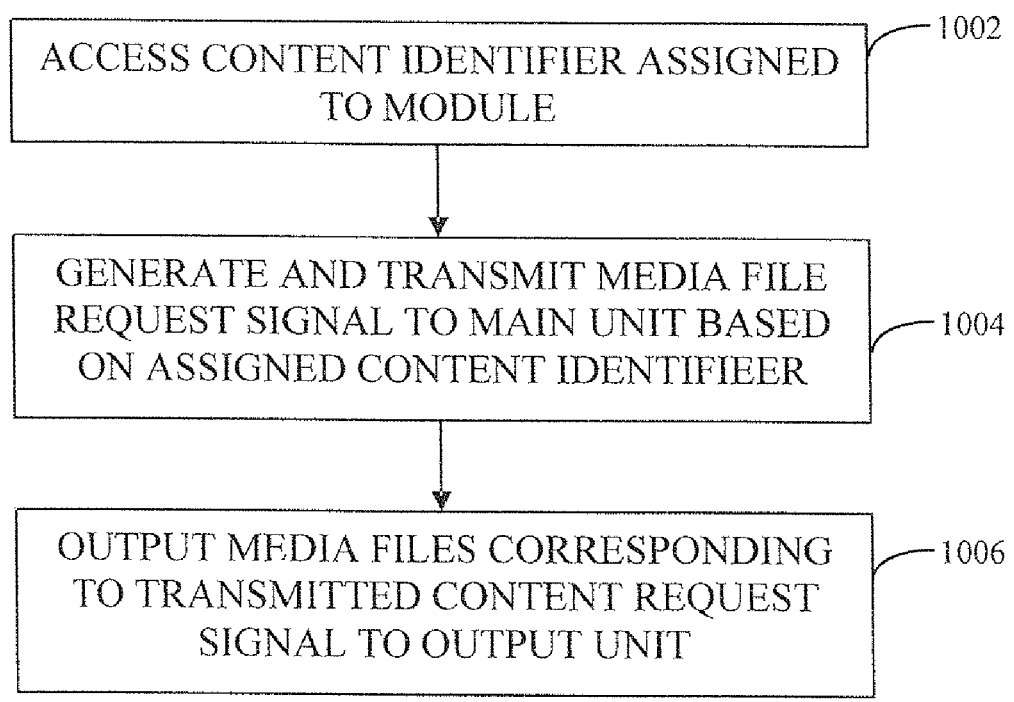
FIG. 10 illustrates a flow chart describing one embodiment of a method in which media files can be output to the output unit shown in FIG. 8.

FIG. 10 illustrates a flow chart describing one embodiment of a method in which media files can be output to the output unit shown in FIG. 8.

At 1002, the remote unit 802 accesses a content identifier which has already been assigned to the interface module 104 according to, for example, the process described above. In one embodiment, the assigned content identifier is accessed when the interface module 104 is attached to (i.e., received by) the remote unit 802. Accordingly, the module controller component 312 retrieves the assigned content identifier stored within the module memory 908, generates content identifier information representing the assigned content identifier and outputs the content identifier information to the module communication component 316. The module communication component 316 then transmits the content identifier information to the remote unit 802 via the remote communication component 906 where it is subsequently output to the remote controller component 902.

At 1004, the remote controller component 902 generates a media file request signal based on the content identifier represented within the content identifier information output by the remote communication component 906. In one embodiment, the media file request signal is adapted to cause the main unit 102 to output the media file identified by the accessed content identifier to the output unit 106 that is coupled to the remote unit 802. Accordingly, the media file request signal may, for example, contain the output unit address of the output unit 106 that is coupled to the remote unit 802 and the accessed content identifier. The generated media file request signal is then output to the remote output component 904 where it is subsequently transmitted to the main unit 102 (e.g., via the communication link 110). At 1006, the main unit 102 responds to the media file request signal by outputting the media file identified by the accessed content identifier to the output unit 106 that is coupled to the remote unit 802 as described above.

By using the remote unit 802 and interface module 104 as described above with respect to FIGS. 8-10, a user is able to quickly and intuitively control to which output unit 106 (if more than one output unit exists) the main unit 102 should output a particular media file. Moreover, because the touch-sensitive display 204 can be provided as an e-ink display, the interface module 104 can present an image indefinitely without requiring power and without having to be continuously driven by driver circuitry. Accordingly, an interface module having a content identifier assigned thereto can be detached from both the main unit 102 and the remote unit 802 and retain whatever image it was previously driven by the driver circuitry to present.

While the embodiments herein disclosed have been described by means of specific examples and applications thereof, numerous modifications and variations could be made thereto by those skilled in the art without departing from the scope of the invention set forth in the claims.

What is claimed:

1. An interface apparatus, comprising:
  a main unit adapted to cause media files to be output to an output unit;
  an array of interface modules coupled to the main unit, the array of interface modules adapted to present an image to a user, wherein each interface module in the array of interface modules is adapted to be engaged by the user and to generate a signal when engaged by the user;
  a driver circuitry adapted to drive the array of interface modules to present an image to the user based, at least in part, upon a signal generated by a user's engagement with an interface module of the array of interface modules; and
  a remote unit coupled to the output unit,
  wherein each interface module in the array of interface modules comprises a touch-sensitive display adapted to generate the signal when engaged by the user, and wherein the touch-sensitive display comprises an e-ink display;
  wherein the main unit is further adapted to assign a content identifier to an interface module of the array of interface modules, the content identifier identifying a media file,
  wherein the interface modules are further adapted to be detachably coupled to the main unit and to the remote unit, and
  wherein the remote unit is adapted to access the content identifier assigned to the interface module coupled thereto and to transmit a media file request signal to the main unit based on the content identifier, the media file request signal adapted to cause the main unit to output a media file identified by the content identifier at the output unit.

2. The interface apparatus of claim 1, wherein the driver circuitry is adapted to drive each interface module based on output characteristics of media files that the main unit can cause to be output at the output unit to present a composite image across the array of interface modules, the composite image comprising a plurality of constituent images, wherein each constituent image visually identifies a media file.

3. The interface apparatus of claim 2, wherein the driver circuitry is adapted to drive each interface module to present a constituent image.

4. The interface apparatus of claim 3, wherein the driver circuitry is adapted to drive each interface module to present a scaled image across the array of interface modules based upon a signal generated by an interface module that is driven to present the constituent image within the composite image.

5. The interface apparatus of claim 4, wherein the driver circuitry is adapted to drive each interface module to present a content-information image across the array of interface modules, the content-information image corresponding to the scaled image presented across the array of interface modules.

6. A The interface apparatus of claim 1, wherein the interface module is adapted to present an image after being detached from the main unit.

7. The interface apparatus of claim 1,
  wherein the driver circuitry is adapted to perform in a manner selected from a group consisting essentially of:
  driving each interface module based on output characteristics of media files that the main unit can cause to be output at the output unit to present a composite image across the array of interface modules, the composite image comprising a plurality of constituent images, wherein each constituent image visually identifies a media file;
  driving each interface module to present a scaled image across the array of interface modules based upon a signal generated by an interface module driven to present the constituent image within the composite image; and
  driving each interface module to present a content-information image across the array of interface modules, the content-information image corresponding to the scaled image presented across the array of interface modules, and
  wherein the interface module is adapted to present an image after being detached from the main unit.

8. An interface apparatus, comprising:
  an interface module adapted to be driven to present an image to a user;
  a main unit adapted to cause media files to be output to an output unit, the main unit further adapted to be detachably coupled to the interface module and, when coupled to the interface module, to assign a content identifier to the interface module, the content identifier identifying a media file;

a driver circuitry adapted to drive the interface module to present an image corresponding to the assigned content identifier; and a remote unit coupled to the output unit adapted to be detachably coupled to the interface module, wherein, when coupled to the interface module, the remote unit is adapted to access the content identifier assigned to the interface module coupled thereto and to transmit a media file request signal to the main unit based on the content identifier, the media file request signal adapted to cause the main unit to output a media file identified by the content identifier at the output unit, and wherein each interface module in the array of interface modules comprises a touch-sensitive display adapted to generate the signal when engaged by the user, and wherein the touch-sensitive display comprises an e-ink display.

9. The interface apparatus of claim 8, wherein the interface module is adapted to present an image after the main unit is detached from the interface module.

10. An interface method, comprising:

driving an array of interface modules coupled to a main unit to present an image across the array of interface modules based upon output characteristics of media files that the main unit can cause to be output at an output unit;

generating a signal upon a user's engagement with an interface module;

updating the image presented across the array of interface modules based, at least in part, upon the signal generated upon the user's engagement with the interface module;

generating the signal upon touching of a touch-sensitive display of an interface module, the touch-sensitive display comprising an e-ink display;

assigning a content identifier to an interface module of the array of interface modules, the content identifier identifying a media file;

receiving the interface module having the content identifier assigned thereto at a remote unit;

accessing, at the remote unit, the content identifier assigned to the interface module;

transmitting a media file request signal from the remote unit to the main unit based on the content identifier; and outputting a media file to the output unit from the main unit based upon the media file request signal, the output media file being identified by the assigned content identifier.

11. The interface method of claim 10, further comprising driving each interface module based on output characteristics of media files that the main unit can cause to be output at the output unit to present a composite image across the array of interface modules, the composite image comprising a plurality of constituent images, wherein each constituent image visually identifies a media file.

12. The interface method of claim 11, further comprising driving each interface module to present a constituent image.

13. The interface method of claim 12, further comprising driving each interface module to present a scaled image across the array of interface modules based upon a signal generated by an interface module driven to present the constituent image within the composite image.

14. The interface method of claim 13, further comprising driving each interface module to present a content-information image across the array of interface modules, the content-information image corresponding to the scaled image presented across the array of interface modules.

15. The interface method of claim 10, further comprising:

a step selected from a group consisting essentially of:

driving each interface module based on output characteristics of media files that the main unit can cause to be output at the output unit to present a composite image across the array of interface modules, the composite image comprising a plurality of constituent images wherein each constituent image visually identifies a media file;

driving each interface module to present a constituent image;

driving each interface module to present a scaled image across the array of interface modules based upon a signal generated by an interface module driven to present the constituent image within the composite image; and driving each interface module to present a content-information image across the array of interface modules, the content-information image corresponding to the scaled image presented across the array of interface modules.

16. A method of fabricating an interface apparatus, comprising:

providing a main unit adapted to cause media files to be output to an output unit;

providing an array of interface modules coupled to the main unit, the array of interface modules adapted to present an image to a user, wherein the step of providing the array of interface modules comprises providing each interface module in the array of interface modules being engageable by the user and generating a signal when engaged by the user;

providing a driver circuitry adapted to drive the array of interface modules to present an image to the user based at least in part upon a signal generated by a user's engagement with an interface module; and providing a remote unit coupled to the output unit, wherein the step of providing the array of interface modules comprises providing each interface module in the array of interface modules with a touch-sensitive display adapted to generate the signal when engaged by the user, and wherein the touch-sensitive display comprises an e-ink display, wherein the main unit providing step further comprises adapting the main unit to assign a content identifier to an interface module of the array of interface modules, the content identifier identifying a media file, wherein the interface modules providing step further comprises adapting the interface modules to be detachably coupled to the main unit and to the remote unit, and wherein the remote unit providing step further comprises adapting the remote unit to access the content identifier assigned to the interface module coupled thereto and to transmit a media file request signal to the main unit based on the content identifier, the media file request signal adapted to cause the main unit to output a media file identified by the content identifier at the output unit.

17. The method of claim 16, wherein the driver circuitry providing step comprises adapting the driver circuitry to drive each interface module based on output characteristics of media files that the main unit can cause to be output at the output unit to present a composite image across the array of interface modules, the composite image comprising a plurality of constituent images wherein each constituent image visually identifies a media file.

18. The method of claim 17, wherein the driver circuitry providing step comprises adapting the driver circuitry to drive each interface module to present a constituent image.

19. The method of claim 18, wherein the driver circuitry providing step comprises adapting the driver circuitry to drive each interface module to present a scaled image across the array of interface modules based upon a signal generated by an interface module driven to present the constituent image within the composite image.

20. The method of claim 19, wherein the driver circuitry providing step comprises adapting the driver circuitry to drive each interface module to present a content-information image across the array of interface modules, the content-information image corresponding to the scaled image presented across the array of interface modules.

21. The method of claim 16, wherein the interface module providing step further comprises adapting the interface module to present an image after being detached from the main unit.

22. The method of claim 16
  wherein the driver circuitry providing step further comprises adapting the driver circuitry to perform in a manner selected from a group consisting essentially of:
    driving each interface module based on output characteristics of media files that the main unit can cause to be output at the output unit to present a composite image across the array of interface modules, the composite image comprising a plurality of constituent images wherein each constituent image visually identifies a media file;
    driving each interface module to present a scaled image across the array of interface modules based upon a signal generated by an interface module driven to present the constituent image within the composite image; and
    driving each interface module to present a content-information image across the array of interface modules, the content-information image corresponding to the scaled image presented across the array of interface modules, and
  wherein the interface module providing step further comprises adapting the interface module to present an image after being detached from the main unit.

* * * * *

UNITED STATES PATENT AND TRADEMARK OFFICE
CERTIFICATE OF CORRECTION

PATENT NO. : 8,325,149 B2
APPLICATION NO. : 12/707624
DATED : December 4, 2012
INVENTOR(S) : Sakai et al.

It is certified that error appears in the above-identified patent and that said Letters Patent is hereby corrected as shown below:

In the CLAIMS:
    Claim 6, column 16, line 35, delete "A The" and insert --The--.

Signed and Sealed this
Twenty-fifth Day of June, 2013

Teresa Stanek Rea
*Acting Director of the United States Patent and Trademark Office*